Dec. 27, 1966  W. J. ANDERSON  3,294,144
REPAIR PATCH
Filed Oct. 6, 1961

William J. Anderson
INVENTOR.

BY Ramsey, Kolisch & Hartwell
Attys.

United States Patent Office 3,294,144
Patented Dec. 27, 1966

3,294,144
REPAIR PATCH
William J. Anderson, Rte. 1, Box 26,
Newberg, Oreg. 97132
Filed Oct. 6, 1961, Ser. No. 143,473
11 Claims. (Cl. 152—367)

This invention relates to patching devices, and more particularly to patching devices having cord distributed therein with such cord functioning to strengthen the patching device. An ordinary and usual application for the patching device is in the repair of damaged tire casings. The invention covers a novel patching device, and also the method of repairing a damaged casing.

When the casing of the ordinary passenger car tire is damaged, the tire is discarded, since the initial cost of such tires is relatively low and the expense of repairing the casing is not justified. With larger tires, such as truck and larger vehicle tires, initial tire costs are somewhat higher, and it is an economical practice to attempt to repair a damaged tire casing provided the same can be done safely and effectively.

According to conventional techniques, when repairing a tire casing a patch is secured to the inside of the casing with such containing multiple layers or plies of cord material, and with the cord material of any given layer extending in parallel, substantially straight reaches that are diagonally disposed with respect to the reaches of the cord material of plies adjacent. Each cord layer in the patch has a degree of flexibility in a direction extending transversely of the reaches of the cord therein, but in a direction paralleling the reaches of cord flexibility is negligible. As a consequence, the patch produces a relatively stiff reinforcement of the injured area of the tire casing. The patch is not effective to pull margins of an injured area together and resiliently join them thus to restore the tire. The generally stiff nature of the patch has also tended to produce pounding of the tire when the tire is used. With certain types of tires, and at certain locations in a tire such as bead and tread shoulder areas, patching has not been advisable because of flexing occurring in these areas.

A general object of this invention is to provide improved means for patching a tire casing or similar article, that is strong enough safely to repair the damaged area of the article, and that also is characterized by a flexibility that accommodates flexing in the article thus to take care of the problems generally indicated above.

The patching means contemplated, instead of merely reinforcing a damaged casing, tends to pull in margins of the damaged area in a casing and tie them together through the patching means. Tire casings that formerly could not be repaired except with the greatest difficulty, may now be repaired easily and satisfactorily. Repaired tires have strength and flexibility characteristics approximately corresponding to those of the original tire.

Another general object is to provide improved means for patching a tire casing or like article, which is easily used to make the desired repair, without exercising the care previously required that cord in the patching means have a particular angular relationship with respect to the cord of the casing undergoing the repair.

A still further object is to provide means for patching an article that is devoid of cord ends adjacent the margins thereof, and that as a consequence is better enabled to resist edge or ply-end lifting, such as occurs commonly with conventional types of patching devices.

According to an embodiment of the invention, a tire casing may be repaired by securing to the inside of the casing, over the damaged area, one or more patching units, each of which comprises a disc-shaped body having cord therein wound in a flat spiral. The cord ordinarily has an end adjacent the center of the disc-shaped body, and spirals outwardly to the margin of the body, and thence spirals inwardly to its opposite end adjacent the center of the body. Thus, the body is devoid of cord ends around the margin thereof. In repairing a tire casing, plural units may be positioned over the damaged area, with the units radially offset with respect to each other and having a common overlap over the damaged area of the casing. When the units subsequently are bonded in place, as by applying heat and pressure, an integral patch is formed joined solidly to the interior of the casing.

In another embodiment of the invention, a patching device is contemplated comprising, as an integral piece, plural disc-shaped cord layers, with the cord of each layer wound in a flat spiral, and with the cord layers overlapping in the manner that the units are overlapped as discussed in the first embodiment. The device may be placed as a one-piece unit over a damaged area, and bonded in place, with the overlapped portions of the cord layers strengthening the damaged area.

More specifically, therefore, an object of the invention is to provide a patching unit, comprising a flat body having cord therein, wherein the cord is wound in a flat spiral extending substantially in the plane of the body of the patching unit.

Another object is to provide a novel patch for a tire casing wherein the patch comprises multiple overlapped cord layers, with the cord in each layer extending in arcuate sweeps and intersecting at multiple angles the cord of adjacent layers.

A further object is to provide an improved method for repairing damaged tire casings and like articles, wherein plural cord layers are applied over a damaged area, with the cord of each layer being wound in a flat spiral and overlapping in a region extending over the damaged area with the cord of adjacent layers.

These and other objects and advantages are attained by the invention, and the same is described hereinbelow in conjunction with the accompanying drawings, wherein.

Figure 2:
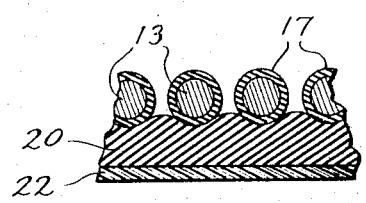
FIG. 2 is a cross-sectional view, taken along the line 2—2 in FIG. 1, and on a slightly larger scale, illustrating details of the construction of a patching unit.
Figure 1:
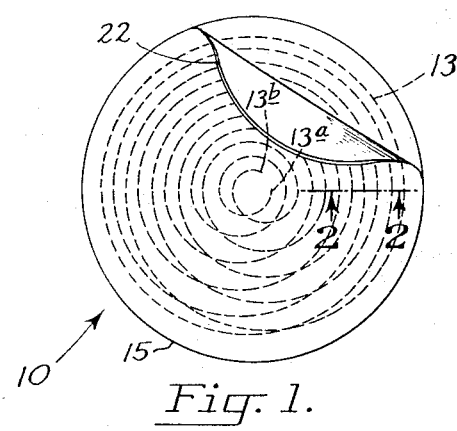
FIG. 1 illustrates one side of a patching unit as contemplated in an embodiment of the invention.

Referring now to the drawings, and more particularly to FIGS. 1 and 2, a patching unit is indicated generally at 10. The unit shown has a flat, disc-shaped body, with a substantially circular outline. While a circular body is shown, other shapes such as oval shapes, etc., may be used, if such is deemed desirable.

Over one side of patching unit 10 is an elongated cord 13. The cord is on the side of the unit away from the viewer in FIG. 1, and thus its outline only is indicated by the single dashed line in FIG. 1. The cord is wound in a substantially flat spiral extending substantially in the plane of the body of unit 10. At 13a there is indicated one end of cord 13. Progressing from end 13a (which is adjacent the center of the body of the unit) the cord spirals in a first set of turns of enlarging radius outwardly toward the margin 15 of the patching unit. Thence the cord spirals in a second set of turns of diminishing radius, with such turns interposed with the first-mentioned set of turns, inwardly toward the center of the unit, and ends at an end 13b adjacent end 13a.

Any suitable material may be used for the cord in the patching unit. Thus, it could be wire, cotton, rayon, nylon, etc., depending upon the type of repair contemplated. As is conventional in the tire making art, the cord if made of some fiber may be impregnated with suitable material, to increase its bonding capability with the material forming the remainder of the patching unit. The cord ordinarily is embedded in an elastomer coating, such as gum rubber and the like, and such coating is indicated at 17.

Extending over one side of the spiraled cord 13 is a layer of material 20 having bonding properties and provided for the purpose of securing the patching unit in place. Layer of material 20 ordinarily takes the form of a layer of vulcanizable rubber, or similar elastomer. With such a layer of material, and upon applying heat and pressure, in a final patch cord 13 becomes substantially completely embedded in the material.

At 22 there is indicated a covering, removable from the outer surface of layer 20. Such may be made of plastic or the like, and is provided to protect the outer surface (which is the surface which is bonded to a tire casing when the patching unit is used and often may be chemically treated).

Figure 4:
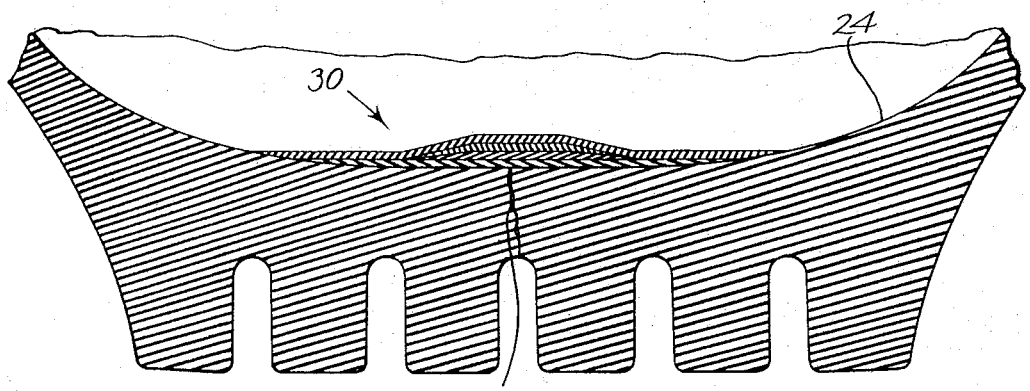
FIG. 4 is a cross-sectional view, taken along the line 4—4 in FIG. 3.
Figure 3:
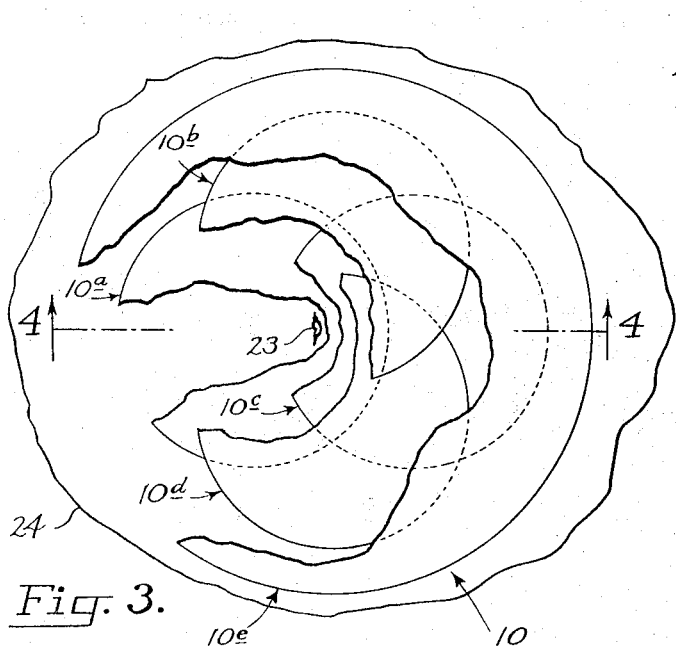
FIG. 3 is a view showing portions of a tire casing, and how the same may be patched over the inside thereof, with portions of patching units employed broken away.

Describing now how a damaged tire casing may be repaired using patching units 10, and with reference now to FIGS. 3 and 4, at 23 is indicated a damaged area of a tire casing 24. First the inside of the casing over the damaged area 23 is cleaned, and prepared in the usual manner to receive the patching units. A number of patching units 10 then have their coverings 22 removed, to expose the outer surfaces of their layers 20. They are then placed over the damaged area, with their layers 20 facing the inside of the casing, and with the units eccentrically arranged, i.e., with their centers radially offset, to form an assembly where the margins of the units are overlapped in a region common to all the units. Such units are indicated at 10a, 10b, 10c, and 10d in FIG. 3. The units are positioned with the region where they all overlap disposed directly over damaged area 23. To complete the assembly, a patching unit 10e of somewhat larger size may be placed over the top of the various smaller units, as a crown. The entire group of patching units may then be bonded together and permanently in place against the casing, using such heat and pressure as is conventional in ordinary patching procedures.

In the patched and repaired tire, the cord of each patching unit, in that portion of the unit that is overlapped, extends in arcuate sweeps approximately corresponding to the sweep defined by the curved perimeter of the unit. Thus, it will be noted, with reference to FIG. 3 and the outlines indicated for the various units, that where adjacent patching units overlap the cord of one unit crosses the cord of adjacent units at varying angles. This contributes to strength in all directions in the completed patch. Each portion of the completed patch that originally was a patching unit resembles a watch spring when flexed, as previously described. Thus, in each of such portions stretching in a radial direction produces lateral spreading of the turns of cord therein, and stretching in what can be thought of as a tangential direction produces a straightening of the turns of cord. Such stretching is resisted by the resilient nature of the elastomer that originally formed layer 20, and that in the complete patch embeds the cord. In the overlapped region, of course, considerable strength is provided due to the multiple ply construction.

Figure 5:
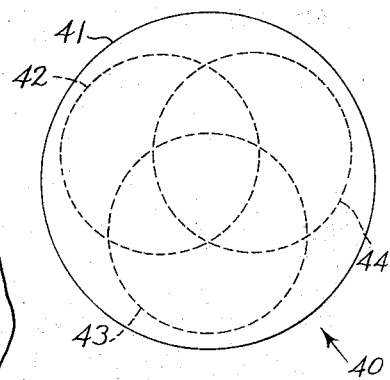
FIG. 5 illustrates another embodiment of the invention.

In another embodiment of the invention, a patching device such as that indicated at 40 in FIG. 5 is contemplated. Device 40 comprises multiple cord layers, indicated in outline at 41, 42, 43, and 44, corresponding to the multiple cord layers produced in a completed patch using patching units 10. Device 40 may be made, for instance, by arranging patching units in place as when making a tire patch, and suitably securing them together. As in the case of the patching units, the cord of each cord layer is wound in a flat spiral extending substantially in the plane of the layer. Further, preferably the cord of each layer has ends adjacent the center of the layer, and extends from these ends in turns of enlarging radius to the outer margin of the layer, and then in turns of diminishing radius back to the center. The cord of layers 42, 43, and 44 is overlapped in a region common to all the layers, and the cord of layer 41 crowns the entire device. Device 40 may be placed as a unit over a damaged area on a tire casing, and then bonded in place, to produce a repaired casing with a final patch thereon similar to the one shown in FIGS. 3 and 4.

The invention may be incorporated in patching units or devices differing somewhat from those just specifically described. For instance, instead of using vulcanizable rubber in layer 20 of a patching unit, a cured rubber layer may be used, and a chemical agent relied upon to produce bonding of the rubber layer to the inner surface of a tire casing. In the manufacture of device 40, patching units such as patching units 10 may be properly positioned, and then secured together, with or without vulcanizing of the rubbery portions of the units. Obviously the number of units used in making a patch can be varied, depending upon the circumstances.

It will be seen that in both embodiments of the invention, in a completed patch there is intersection at various angles of the cord of one layer with the cords of adjacent layers. Each layer of cord has a watch-spring type of flexibility and resilience. Each layer of cord strengthens the layer of cord adjacent. Maximum strength is directly over the damaged area. There are no cord ends exposed at the margins of the patch.

I claim:

1. A patching unit comprising an elastic substantially flat body which in the plane of its body is stretchable in all directions, said body having a length of cord therein wound in a substantially flat spiral extending substantially in the plane of said body, and a mass of an elastomer adjacent said cord holding the wound cord in its spiral form.

2. The patching unit of claim 1, wherein said cord has two ends separated by multiple spiral windings, and both of said ends are located in the body of the patching unit inwardly from marginal spiral windings of cord.

3. A patching unit comprising a substantially flat body having cord therein wound in a substantially flat spiral extending substantially in the plane of the body, said cord having an end disposed adjacent the center of the body of the patching unit and spiraling in a first set of turns outwardly to adjacent the outer margin of said body and then spiraling in turns in a second set of turns inwardly toward the center of said body with said second set of turns disposed beside said first set of turns.

4. A patching unit comprising an elastic substantially flat body which in the plane of its body is stretchable in all directions, said body having a length of cord therein wound in a substantially flat spiral extending substantially in the plane of said body, and over at least one side of said body and joined to said cord a layer of elastomeric material having bonding properties provided for securing the patching unit in place.

5. A patching unit comprising an elastic substantially flat disc-shaped body which in the plane of its body is stretchable in all directions, said body having a length of cord therein wound in a substantially flat spiral extending substantially in the plane of said body, and over at least one side of said body and joined to said cord a layer of elastomeric material that is plasticized upon the application of heat thereto, provided for securing the patching unit in place.

6. The patching unit of claim 5 wherein said cord has two ends separated by multiple spiral windings, and both of said ends are disposed in said body inwardly from marginal spiral windings of cord.

7. A patching device comprising plural disc-shaped cord layers, each of said layers comprising cord wound in a substantially flat spiral, said disc-shaped cord layers occupying a stacked relationship with their centers offset radially and with margins overlapped throughout a central area of the device, and a deposit of elastomeric material between adjacent cord layers joining them together.

8. The patching device of claim 7, wherein the cord of said cord layers has ends, and said ends are located in the device inwardly of the outer margin of the device.

9. In a casing patch, multiple layers of cord with at least part of the layers overlapped over a common region, and elastomeric material between the layers securing them together and securing the layers of cord to the casing, the cord of each layer in the region of the patch where the layers are overlapped extending in arcuate sweeps and the arcuate sweeps of cord of one layer intersecting at multiple angles the arcuate sweeps of cord of adjacent layers.

10. A patching unit comprising an elastic body including cord wound in spiral form, and a mass of elastomeric material joined to the spiraled cord in said body, said elastomeric material being plasticizable upon the application of heat thereto, and providing means for securing the patching unit in place, said body by reason of said spiral windings being stretchable in all directions extending diametrically of the windings.

11. A repair patch having an elastomeric body reinforced with at least one cord extending in a plurality of convolutions, each convolution being equally spaced from each adjacent convolution whereby each convolution will carry a proportionate amount of load across a ruptured area in a tire.

References Cited by the Examiner
UNITED STATES PATENTS

| | | | |
|---|---|---|---|
| 466,169 | 12/1891 | Hume. | |
| 581,235 | 4/1897 | Kenyon | 152—367 |
| 1,580,468 | 4/1926 | Cooper | 152—367 |
| 1,870,275 | 8/1932 | Adams | 28—79 X |
| 2,041,988 | 5/1936 | Wilson | 152—367 |

FOREIGN PATENTS 1,241,957  8/1960  France.

ARTHUR L. LA POINT, *Primary Examiner.*

C. W. HAEFELE, *Assistant Examiner.*